United States Patent
Kurmlavage

(10) Patent No.: US 11,700,958 B2
(45) Date of Patent: Jul. 18, 2023

(54) SNEEZE GUARD AIR CURTAIN ATTACHMENT

(71) Applicant: Spirit Specialty Solutions, Inc., Broomall, PA (US)

(72) Inventor: Michael M Kurmlavage, Monroeville, NJ (US)

(*) Notice: Subject to any disclaimer, the term of this patent is extended or adjusted under 35 U.S.C. 154(b) by 130 days.

(21) Appl. No.: 17/032,235

(22) Filed: Sep. 25, 2020

(65) Prior Publication Data

US 2021/0330097 A1 Oct. 28, 2021

Related U.S. Application Data

(60) Provisional application No. 63/054,261, filed on Jul. 21, 2020, provisional application No. 63/049,167, (Continued)

(51) Int. Cl.
*A47F 10/06* (2006.01)
*F24F 9/00* (2006.01)
(Continued)

(52) U.S. Cl.
CPC .............. *A47F 10/06* (2013.01); *A47B 31/02* (2013.01); *A47F 3/0447* (2013.01);
(Continued)

(58) Field of Classification Search
CPC ...... A47F 3/0443; A47F 3/0447; A47F 3/007; A47F 3/12; A47F 3/001; A47F 3/063; A47F 3/14; A47F 10/06; A47F 2010/065; F16B 5/0685; G09F 23/06; F24F 9/00; B01D 46/0043; A47B 31/02
See application file for complete search history.

(56) References Cited

U.S. PATENT DOCUMENTS 3,942,426 A * 3/1976 Binks ..................... A23L 3/3418
219/400
4,013,880 A * 3/1977 Kennedy, Jr. ........... A47F 10/06
248/220.21
(Continued)

FOREIGN PATENT DOCUMENTS

| CH | 695535 A5 * | 6/2006 | ............. A47F 3/001 |
|---|---|---|---|
| DE | 19841696 A1 * | 3/2000 | ............. A47F 10/06 |

(Continued)

*Primary Examiner* — Patrick D Hawn
(74) *Attorney, Agent, or Firm* — Argus Intellectual Enterprise; Daniel Enea; Jordan Sworen

(57) ABSTRACT

Provided is a sneeze guard attachment for creating an air curtain between display food covered by a sneeze guard and a person. The device includes a panel, a frame affixed to the panel that creates a chamber between the panel and the sneeze guard, and a means for forcing air into the chamber. The chamber includes an open end, which allows the air to be forced out of the chamber in order to create an air curtain. The air curtain separates the display food contained in a food bar/food prep area from the consumer. The device can be retrofitted on any preexisting food shield or sneeze guard, and can be utilized with various types of display food, including food items found in buffets, salad bars, hot food bars, roller grills, made-to-order food operations, catering stands, roller grills, sandwich preparation areas, and the like.

12 Claims, 12 Drawing Sheets

Related U.S. Application Data filed on Jul. 8, 2020, provisional application No. 63/025,237, filed on May 15, 2020, provisional application No. 63/015,103, filed on Apr. 24, 2020.

(51) Int. Cl.
  *B01D 46/00* (2022.01)
  *A47B 31/02* (2006.01)
  *G09F 23/06* (2006.01)
  *A47F 3/04* (2006.01)

(52) U.S. Cl.
  CPC ............ *B01D 46/0043* (2013.01); *F24F 9/00* (2013.01); *G09F 23/06* (2013.01); *A47F 2010/065* (2013.01)

(56) References Cited

U.S. PATENT DOCUMENTS

| | | | | |
|---|---|---|---|---|
| 4,074,108 | A * | 2/1978 | King | H05B 3/00 219/214 |
| 4,892,366 | A * | 1/1990 | Yerman | A47F 3/007 312/140.4 |
| 6,114,659 | A * | 9/2000 | Finck | A47F 3/0447 219/400 |
| 6,367,274 | B1 * | 4/2002 | Mellado | A47F 3/0447 62/255 |
| 6,539,740 | B1 * | 4/2003 | Santana, Jr. | A47F 3/06 62/255 |
| 7,243,506 | B2 * | 7/2007 | Spillner | A47F 3/0447 62/414 |
| 8,362,404 | B2 * | 1/2013 | Emerich | A47J 39/006 219/400 |
| 9,149,154 | B1 * | 10/2015 | Stuck | A47J 39/003 |
| 9,462,897 | B2 * | 10/2016 | Nuttall | F25B 21/02 |
| 10,058,198 | B2 * | 8/2018 | Atkins | A47F 10/06 |
| 11,045,018 | B2 * | 6/2021 | Berents | A47F 3/005 |
| 2004/0189156 | A1 * | 9/2004 | Pearlman | A47F 10/06 312/137 |
| 2014/0097355 | A1 * | 4/2014 | Stolle | A23L 3/28 250/455.11 |
| 2019/0328154 | A1 * | 10/2019 | Berents | A47F 3/005 |
| 2020/0245786 | A1 * | 8/2020 | Kurmlavage | A47F 10/06 |
| 2022/0010994 | A1 * | 1/2022 | Kurmlavage | F24F 9/00 |

FOREIGN PATENT DOCUMENTS

| | | | |
|---|---|---|---|
| FR | 3111530 A3 * | 12/2021 | |
| KR | 20160003439 A * | 1/2016 | A47F 10/06 |

* cited by examiner

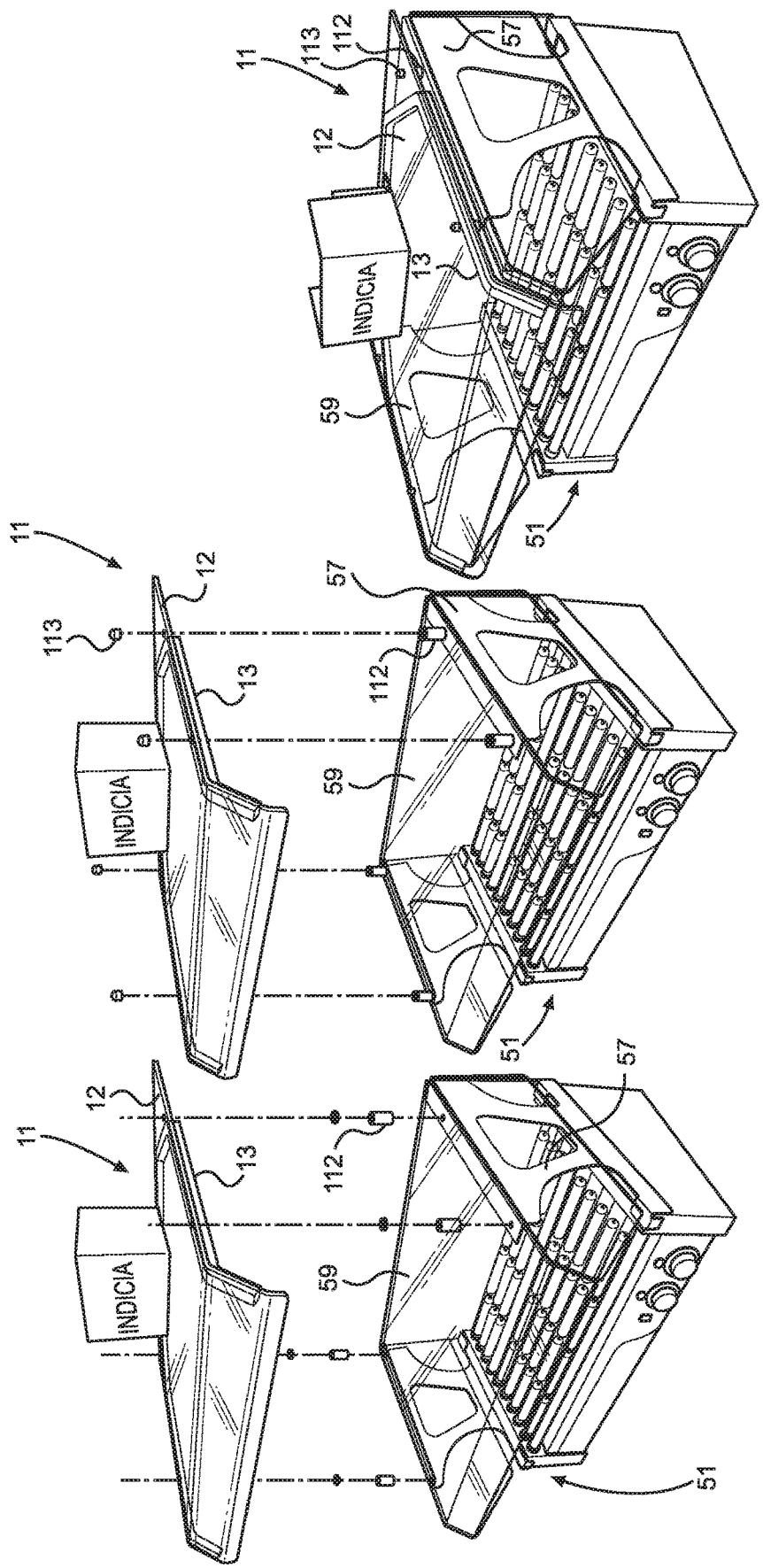

SNEEZE GUARD AIR CURTAIN ATTACHMENT

CROSS-REFERENCE TO RELATED APPLICATIONS

This application claims the benefit of U.S. Provisional Application Nos. 63/015,103 filed on Apr. 24, 2020, entitled "Hot/Cold Food Bar Sneeze Guard With Air Curtain", 63/025,237 filed on May 15, 2020, entitled, "Food Prep Bar Transparent Barrier System With Air Curtain", 63/049,167 filed on Jul. 8, 2020, entitled, "Food Prep Bar Transparent Barrier System With Air Curtain", and 63/054,261 filed on Jul. 21, 2020, entitled, "Roller Grill Transparent Cover With Air Curtain". The above identified patent applications are herein incorporated by reference in their entirety to provide continuity of disclosure.

FIELD OF THE INVENTION

The present invention relates to a sneeze guard for display food. More particularly, it pertains to a sneeze guard attachment for creating an air curtain between display food covered by a sneeze guard and a person to enhance protection of the food products from exposure to contaminants, pathogens, insects, and the like.

BACKGROUND OF THE INVENTION

Display food, such as that found in hot/cold food bars, self-service salad bars, food preparation stations, buffets, and the like have become popular in the food industry. These bars allow consumers to select from a number of prepared food items and condiments in order to create a customized meal. As can be appreciated, the consumer is provided with a variety of prepared items that can be selected according to his or her particular taste.

As can be appreciated, display food is often maintained in an open or partially-open environment so that it visually appeals to a customer in order to influence purchase decisions. While maintaining food in such a display can be financially beneficial to companies and convenient for consumers, it makes such items increasingly susceptible to contamination. As is known, display food that becomes contaminated must be thrown away, as indicated in Food Code ¶ 3.307.11(A)-(D).

A well-known means for preventing contamination of display food is with a sneeze guard. A sneeze guard is a physical barrier that is used to provide sanitary protection of display food by safeguarding against contamination from airborne contamination while permitting viewing and access thereto. A typical sneeze guard includes one or more transparent plastic or glass panels positioned between a consumer and the display food. These devices afford protection from contamination that is expelled from a user on one side of the sneeze guard, and prevent it from making contact with the display food on the other side.

As is known, typical sneeze guards are open and unprotected on the sides to enable consumers to access the food contained therein. The open design allows contaminants to contact the food through these openings. This problem was brought into the forefront of the self-service food operation business with the emergence of the COVID-19 pandemic in early 2020. The pandemic caused restaurants and grocery stores to change their food service policies. For example, stores implemented procedures to enforce "social distancing" policies by placing markers on the floor indicating where to stand, directional arrows to indicate the flow of traffic through stores, and installed plexiglass shields at checkouts to better protect cashiers from human-to-human transmission of pathogens. In addition, virtually all stores closed their display food bars during the pandemic, as recommended by the CDC, local, and state authorities.

The mandated closings had a drastic impact on the self-service food industry. Companies lost considerable amounts of money while closed, employees lost their jobs, and customers lost their freedom to enjoy their favorite foods. As evidenced above, it is clear that enhanced safety measures are required for the food service industry, particularly relating to display foods. Therefore, a need exists for preventing the spread of contaminants associated with display food in a food bar.

SUMMARY OF THE INVENTION

The present invention overcomes the current problems that exist with display food contained in self-service food operations, buffets, salad bars, catering stands, roller grills, sandwich preparation areas, and the like by providing a sneeze guard attachment that creates an air curtain. The device includes a panel, a frame affixed to the panel that creates a chamber between the panel and the sneeze guard, and a means for forcing air into the chamber. The chamber includes an open end, which allows the air to be forced out of the chamber in order to create an air curtain. The air curtain creates a barrier in the otherwise open sides of the sneeze guard. This in turn separates the display food from the consumer, and particularly prevents respiratory droplets produced by the consumer from making contact with the food. The device can be retrofitted to fit existing sneeze guards, and can be utilized with various types of display food, including food items found in buffets, salad bars, hot food bars, roller grills, made-to-order food operations, catering stands, roller grills, sandwich preparation areas, and the like.

The present invention substantially diverges from the devices that are known and disclosed in the prior art and consequently it is clear that there is a need in the art for an improvement to existing open sided sneeze guards. In this regard the instant invention substantially fulfills these needs.

OBJECTS OF THE INVENTION

In view of the foregoing disadvantages inherent in the known types of sneeze guards now present in the prior art, the present invention provides a sneeze guard attachment for use with existing sneeze guards, wherein the same can be utilized for creating an air curtain to separate display food from a consumer.

It is therefore an object of the present invention to provide a new and improved sneeze guard attachment that has all of the advantages of the prior art and none of the disadvantages.

It is another object of the present invention to provide a sneeze guard attachment for use with existing sneeze guards that are known and used in the art.

Another object of the present invention is to provide a sneeze guard attachment that creates an air curtain to separate display food from a consumer.

Yet another object of the present invention is to provide a sneeze guard attachment that includes a panel, a frame affixed to the panel that creates a chamber between the panel and the sneeze guard, and a means for forcing air into the chamber.

Another object of the present invention is to provide a sneeze guard attachment that directs the air curtain down and away from the display food to create a barrier in the otherwise open sides of a sneeze guard.

A final object of the present invention is to provide a sneeze guard attachment that can be utilized with self-service food operations, buffets, salad bars, catering stands, roller grills, sandwich preparation areas, and the like.

Other objects, features and advantages of the present invention will become apparent from the following detailed description.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

Figure 1:
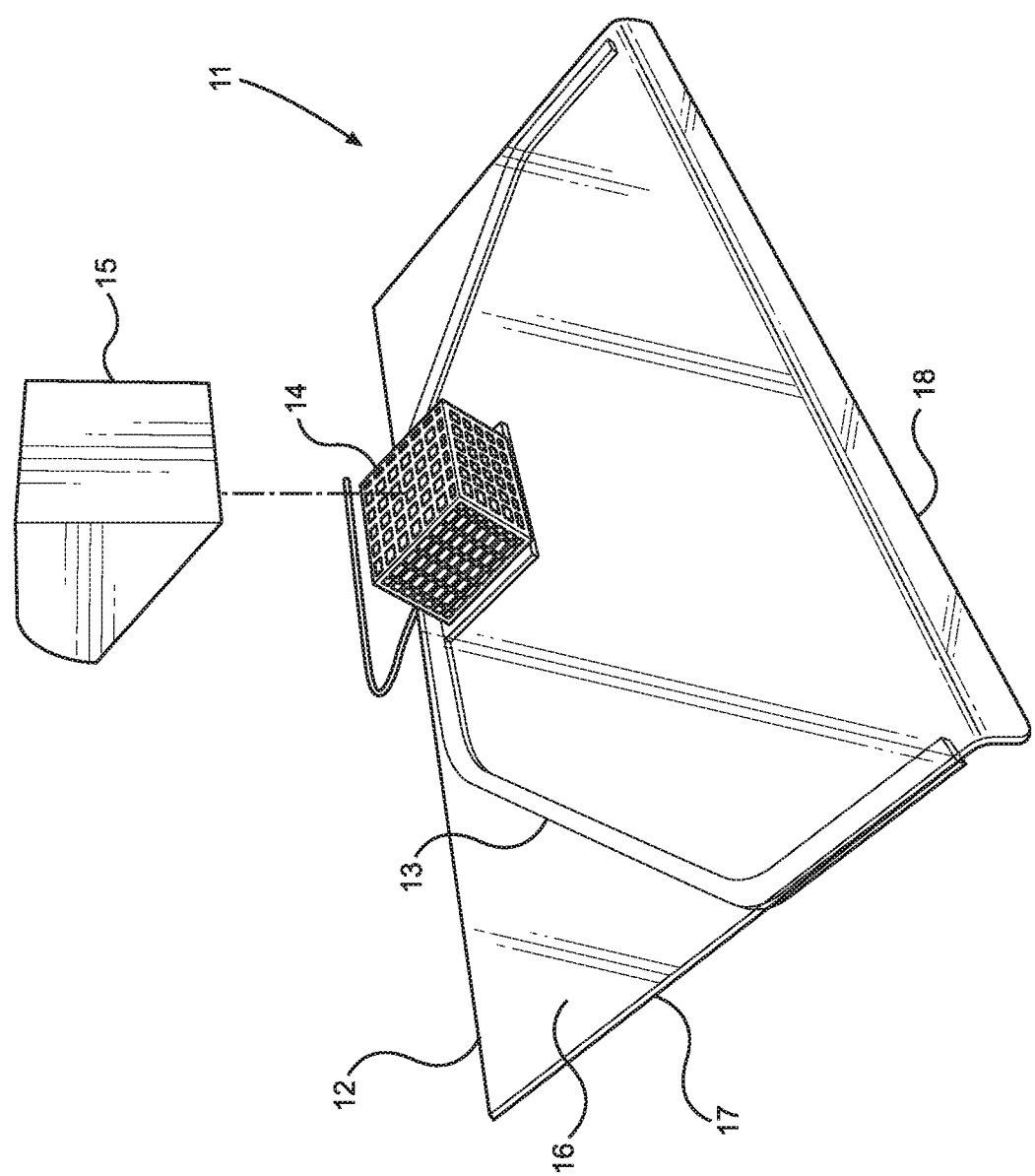
FIG. 1 shows an exploded view of the sneeze guard attachment, including the panel, the frame, the means for generating forced air, and a cover.

FIGS. 10A-C show a perspective view of the sneeze guard attachment being installed on a roller grill.

DETAILED DESCRIPTION OF THE INVENTION

Reference is made herein to the attached drawings. Like reference numerals are used throughout the drawings to depict like or similar elements of the sneeze guard attachment. For the purposes of presenting a brief and clear description of the present invention, the preferred embodiment will be discussed as used for sneeze guard attachment for creating an air curtain. The figures are intended for representative purposes only and should not be considered to be limiting in any respect.

Definitions

"Display food" is food contained within a self-service food operation. Non-limiting examples of display food include food items found in buffets, salad bars, hot food bars, roller grills, made-to-order food operations, catering stands, roller grills, sandwich preparation areas, and the like.

A "Sneeze guard" is a physical barrier that is used to provide sanitary protection of display food by safeguarding against contamination from airborne contamination while permitting viewing and access thereto. A typical sneeze guard includes one or more transparent plastic or glass panels positioned between a consumer and the display food. These devices afford protection from contamination that is expelled from a user on one side of the sneeze guard, and prevents it from making contact with the display food on the other side.

An "Air curtain" is an invisible and continuously blown shield of air that creates a barrier or shield. The air curtain diverts airborne hazards, including insects, contaminants, particles, pathogens, and respiratory droplets away from a location. Air curtains are recommended by the FDA as an effective way to protect food from airborne hazards, as enumerated in Food Code 6-202.15(D)(2). As described herein, air shields prevent insects, contaminants, pathogens, and the like that are expelled from the mouth or nose of a person from contacting the food within the hot/cold food bar.

Referring now to FIG. 1, there is shown an exploded view of the sneeze guard attachment 11, including the panel 12, the frame 13, the means for generating forced air, and a cover 15. The sneeze guard attachment 11 comprises a panel 12, a frame 13 affixed to the panel 12 that creates a chamber between the panel 12 and a sneeze guard (shown below), and a means for forcing air into the chamber. The panel 12 is preferably constructed of a transparent material, such as plexiglas, glass, or the like. The panel 12 has an upper side 16 and a lower side 17. The frame 13 is affixed to the lower side 17 of the panel 12. Preferably, the frame 13 is affixed to the lower side 17 of the panel 12 in a manner that creates an airtight seal therebetween. The frame 13 creates a seal on three ends of the panel 12, thereby forcing air towards the fourth open side 18. Air is directed into the attachment 11 to create an air curtain, as described in more detail below via a means for generating forced air, preferably a fan 14.

As shown, the fan 14 is attached to the upper side 16 of the panel 12. Air is drawn into the fan 14 and forced through an opening in the panel 12 directly below the fan 14. The fan 14 can additionally include a means of filtering or purifying the air prior to its entering the chamber. In a first embodiment, the fan 14 can be operated by an on-off switch. In a second embodiment, the fan 14 can run on a preprogrammed timer. In a third embodiment, the fan 14 can include a motion sensor system that activates the fan 14 when motion is detected, such as when a consumer comes within a predefined distance of the self-service food bar.

In one embodiment, the fan 14 includes one or more of an air scrubber filtration system, such as a HEPA filter or an ultraviolet sterilizer. Any known means for filtering and/or purifying the air can be utilized with the fan 14. A cover 15 is affixed atop the fan 14. The cover 15 provides an aesthetic cover that fits around one or more sides of the fan 14. Preferably, the cover 15 includes advertising indicia, such as a variety of messages, advertisements, and the like.

Figure 2:
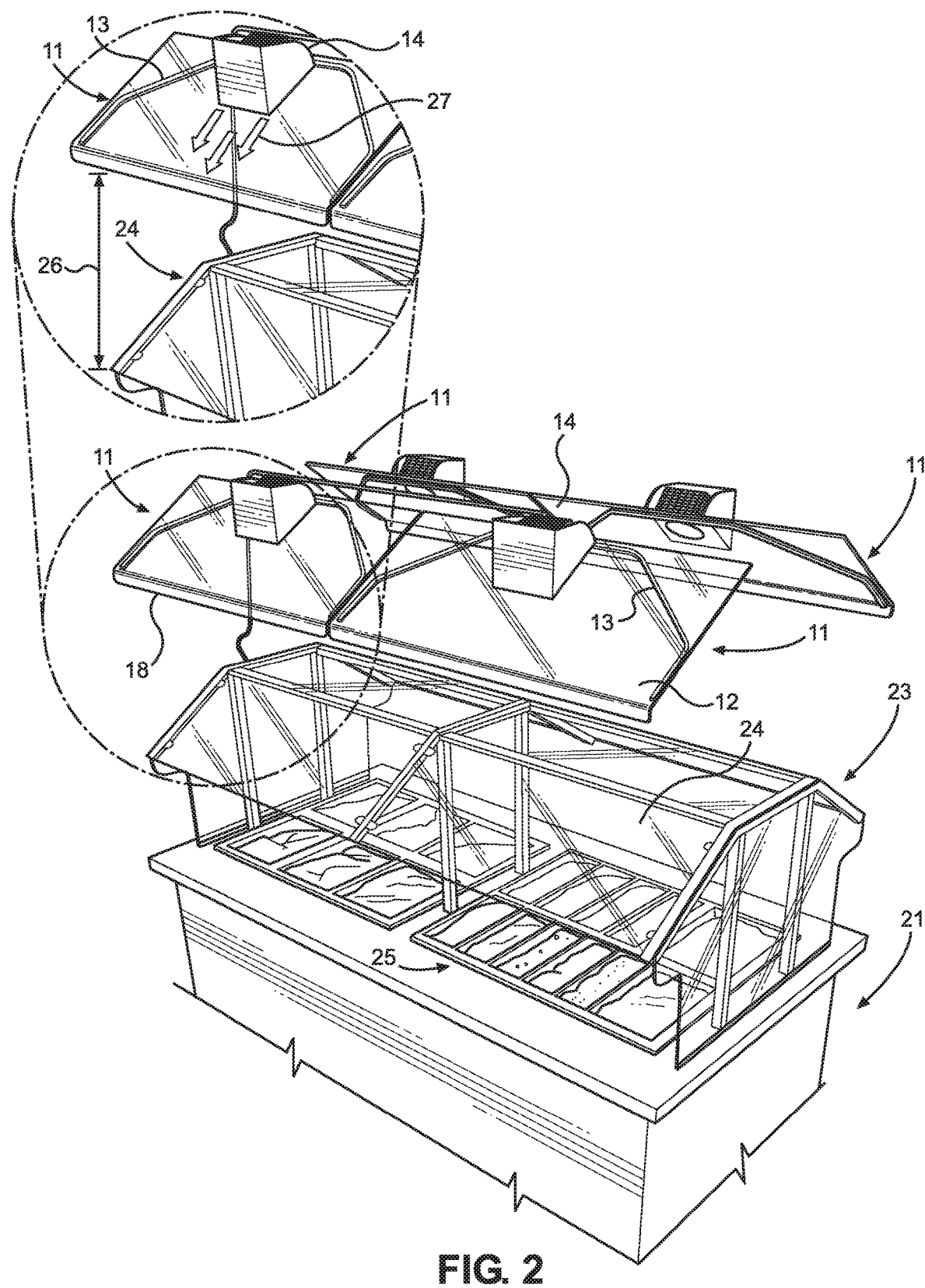
FIG. 2 shows an exploded view of multiple sneeze guard attachments installed on a self-service food bar.

Referring now to FIG. 2, there is shown an exploded view of multiple sneeze guard attachments 11 installed on a self-service food bar 21. The sneeze guard attachment 11 is designed for use with a self-service food bar 21 containing a sneeze guard 23 that is well understood in the art. The sneeze guard attachment 11 is preferably constructed with dimensions that enable it to rest on top of an existing sneeze guard 23. As shown, more than one sneeze guard attachment 11 can be used depending on the size of the self-service food bar 21 and the number of sneeze guard 23 sections contained therein. The sneeze guard attachment 11 is affixed to the panel 24 of the sneeze guard 23. The frame 13 creates a space between the sneeze guard attachment panel 12 and the sneeze guard panel 24, which defines a chamber 26. The arrows represent the air 27 within the chamber 26 and forming the air curtain upon their exit. Air 27 is directed into the chamber 26 via the fan 14, and flows out of the chamber 26 via the fourth open side 18 of the panel 12. The forced air 27 creates an air curtain between the display food 25 within the self-service food bar 21 and the external environment outside of the self-service food bar 21. The sneeze guard attachment 11 can be quickly installed and removed with minimal effort for cleaning or storage.

Figure 3:
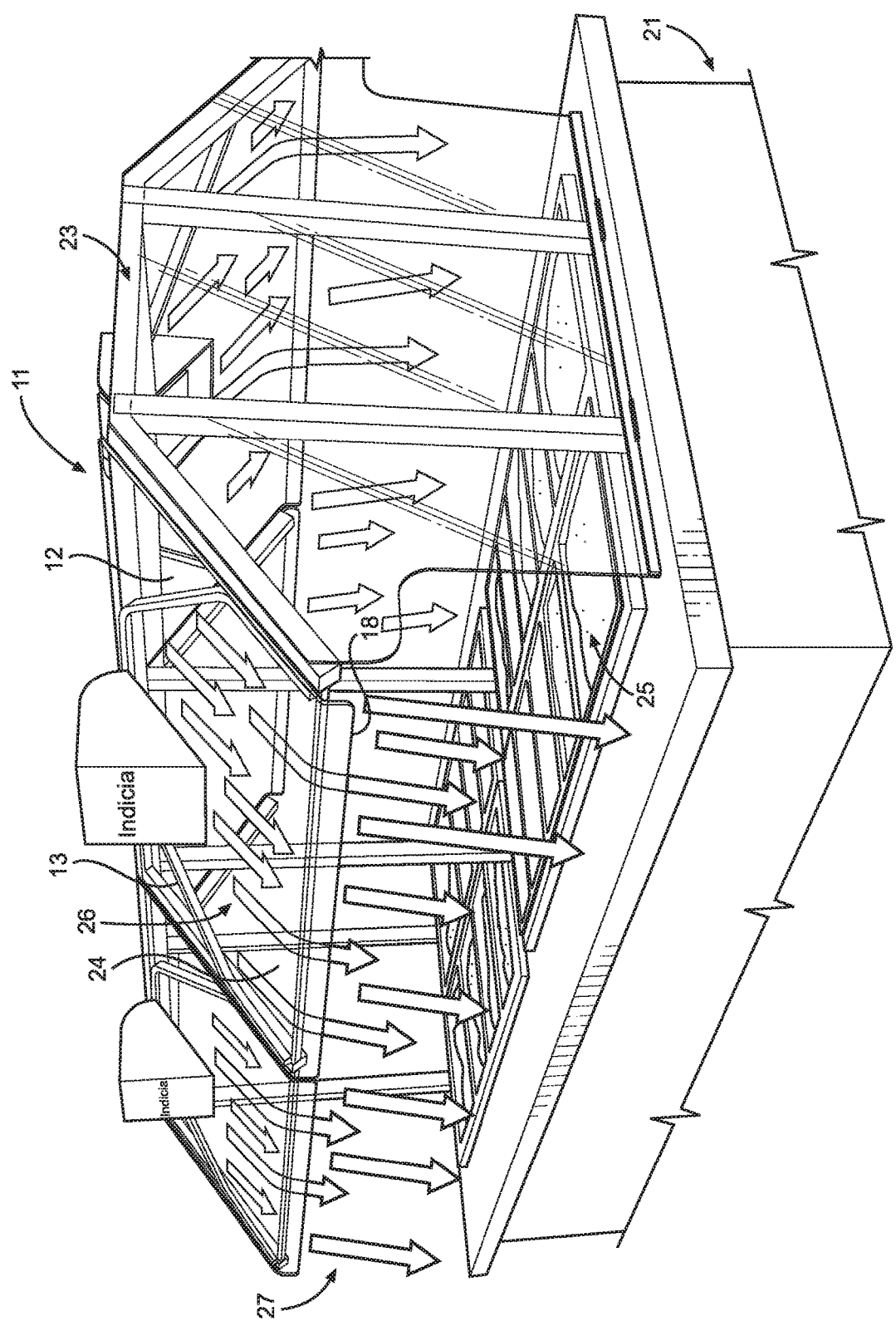
FIG. 3 shows a perspective view of the sneeze guard attachment installed on a sneeze guard of a self-service food bar and creating an air curtain.

Referring now to FIG. 3, there is shown a perspective view of the sneeze guard attachment 11 installed on the sneeze guard 23 of a self-service food bar 21 and creating an air curtain. The frame 13 creates a space between the sneeze guard attachment panel 12 and the sneeze guard panel 24, which defines a chamber 26, as best illustrated in FIG. 2. As shown, the air 27 contained by the frame 13 and between the sneeze guard attachment panel 12 and the sneeze guard panel 24, is within the chamber 26. Air 27 is directed into the chamber 26 via the fan, and flows out of the chamber 26 via the open side 18 of the panel 12. Air 27 flows down towards the base of the self-service food bar 21 and creates an invisible curtain of air between the display food 25 within the self-service food bar 21 and the external environment outside of the self-service food bar 21.

Figure 4:
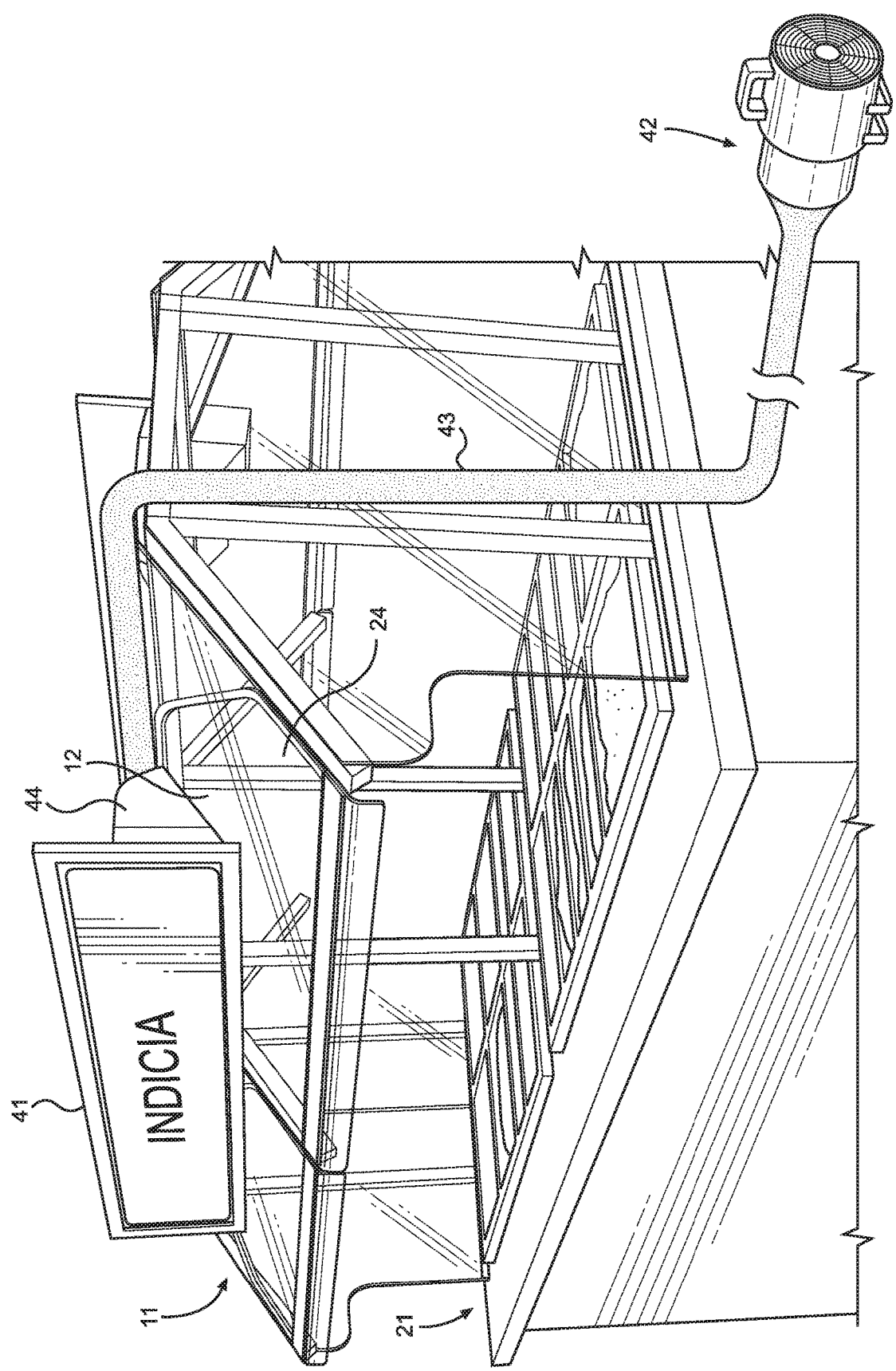
FIG. 4 shows a perspective view of multiple sneeze guard attachments installed on a self-service food bar with an indicia display and utilizing an off-site means for generating forced air.

Referring now to FIG. 4, there is shown a perspective view of multiple sneeze guard attachments 11 installed on a self-service food bar 21 with an indicia display 41 and utilizing an off-site means for generating forced air. In an alternate embodiment, the means for generating forced air can be off-site, such as with a central fan, a blower, a compressor, or the like attached to the panel 12 via one or more ducts 43. In a non-limiting embodiment, the off-site means for generating forced air comprises a central fan 42. The central fan 42 can be positioned in any desired location, such as directly on, adjacent to, or near the sneeze guard attachment 11, wherein one or more ducts are used to supply the forced air into the system. As a non-limiting example, the central fan 42 can be located under the counter of the self-service food bar 21, above or below the self-service food bar 21, in a basement, attic, a different room, or preferably, outside of the building, such as with a central air conditioning system. The air flows through the one or more ducts 43 and into a diffuser 44, wherein the air then flows into the chamber (as best shown in FIG. 2) which is between the sneeze guard attachment panel 12 and the sneeze guard panel 24. The diffuser 44 can include an indicia display 41 on the exterior thereof, which can include a variety of messages, advertisements, and the like. As shown, the indicia display 41 can be attached to more than one diffuser 44, such as when multiple sneeze guard attachments 11 installed on a self-service food bar 21.

In one embodiment, the sneeze guard attachment is designed for use with buffets. In one embodiment, the sneeze guard attachment is designed for use with salad bars. In one embodiment, the sneeze guard attachment is designed for use with hot food bars. In one embodiment, the sneeze guard attachment is designed for use with roller grills. In one embodiment, the sneeze guard attachment is designed for use with made-to-order food operations. In one embodiment, the sneeze guard attachment is designed for use with sampling stands. In one embodiment, the sneeze guard attachment is designed for use with catering stands. In one embodiment, the sneeze guard attachment is designed for use with sandwich preparation areas. While the present invention can be utilized with any kind of sneeze guard attachment, including those mentioned above, specific examples are presented below of how the device can be adapted for use with some of the disclosed made-to-order food operations. The specific examples herein are for illustrative purposes and are not meant be limiting in any capacity.

Figure 5:
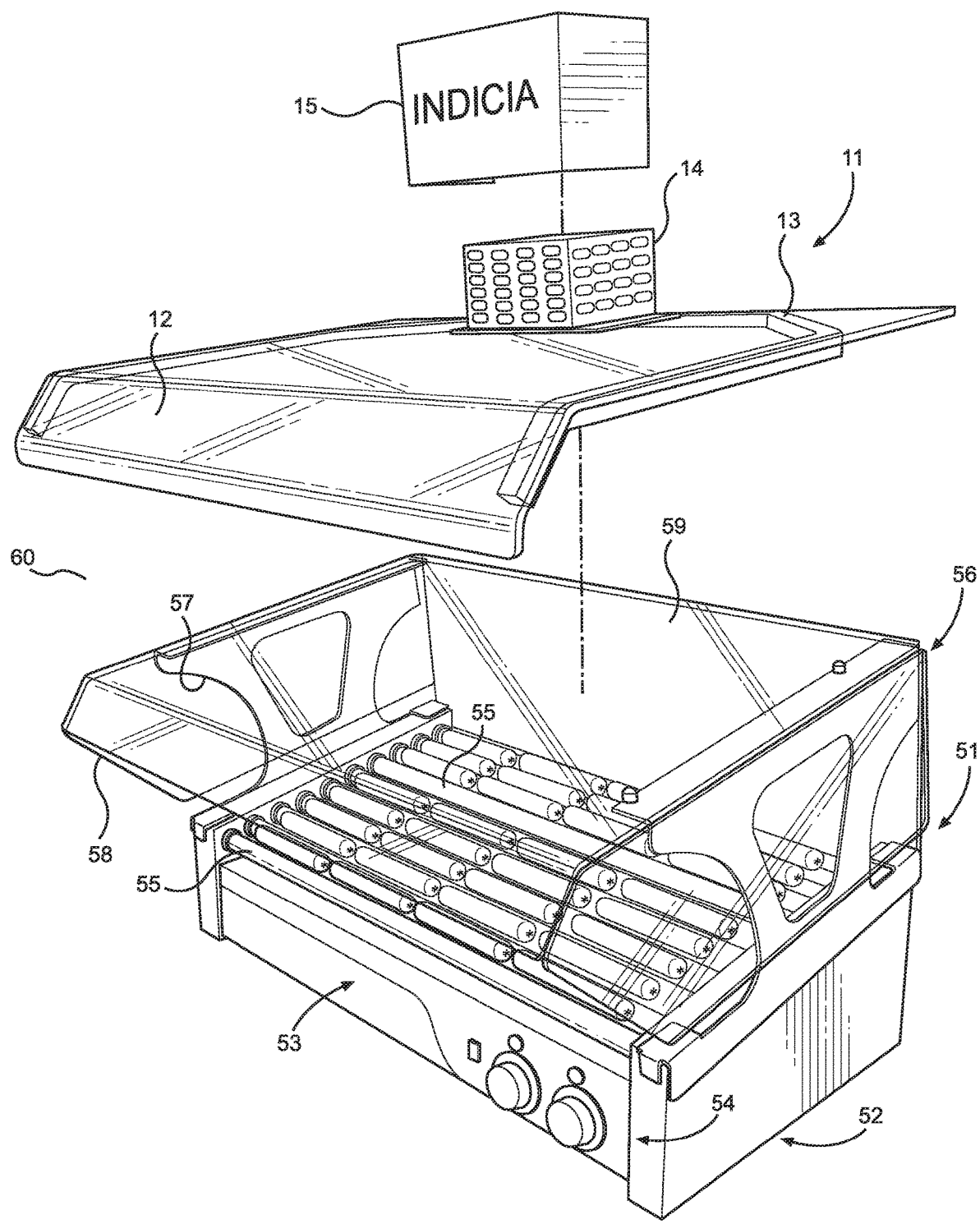
FIG. 5 shows an exploded view of the panel, the frame, the means for generating forced air, a cover, and a roller grill.

Referring now to FIG. 5, there is shown an exploded view of the panel 12, the frame 13, the means for generating forced air 14, a cover 15, and a roller grill 51. The roller grill 51 comprises a housing 52 having a main body 53 and a pair of sidewalls 54 extending above the body 53, a plurality of spaced apart tubular rollers 55 disposed between the sidewalls 54, and a heating element (not shown). Positioned on top of the roller grill assembly 51 is a sneeze guard 56 comprising a frame 57, a pair of side panels 58, and a top panel 59. In this embodiment, the sneeze guard attachment 11 is designed for use with a roller grill 51 containing a sneeze guard 56 that is well understood in the art. The sneeze guard attachment 11 is preferably constructed with dimensions that enable it to rest on top of an existing roller grill sneeze guard 56. The sneeze guard attachment 11 is affixed to the panel 59 of the sneeze guard 56. The frame 13 creates a space between the sneeze guard attachment panel 12 and the roller grill sneeze guard panel 59, which defines a chamber 60.

In all embodiments of the present invention, and as best represented in FIG. 5, the cover 15 can be designed with customized indicia to advertise logos, trademarks, slogans, and descriptions of the display food. Non-limiting examples include advertisements for particular types of foods during the year, sales, special items, and the like. The cover 15 can be quickly removed and replaced with updated advertising indicia as desired.

Figure 6:
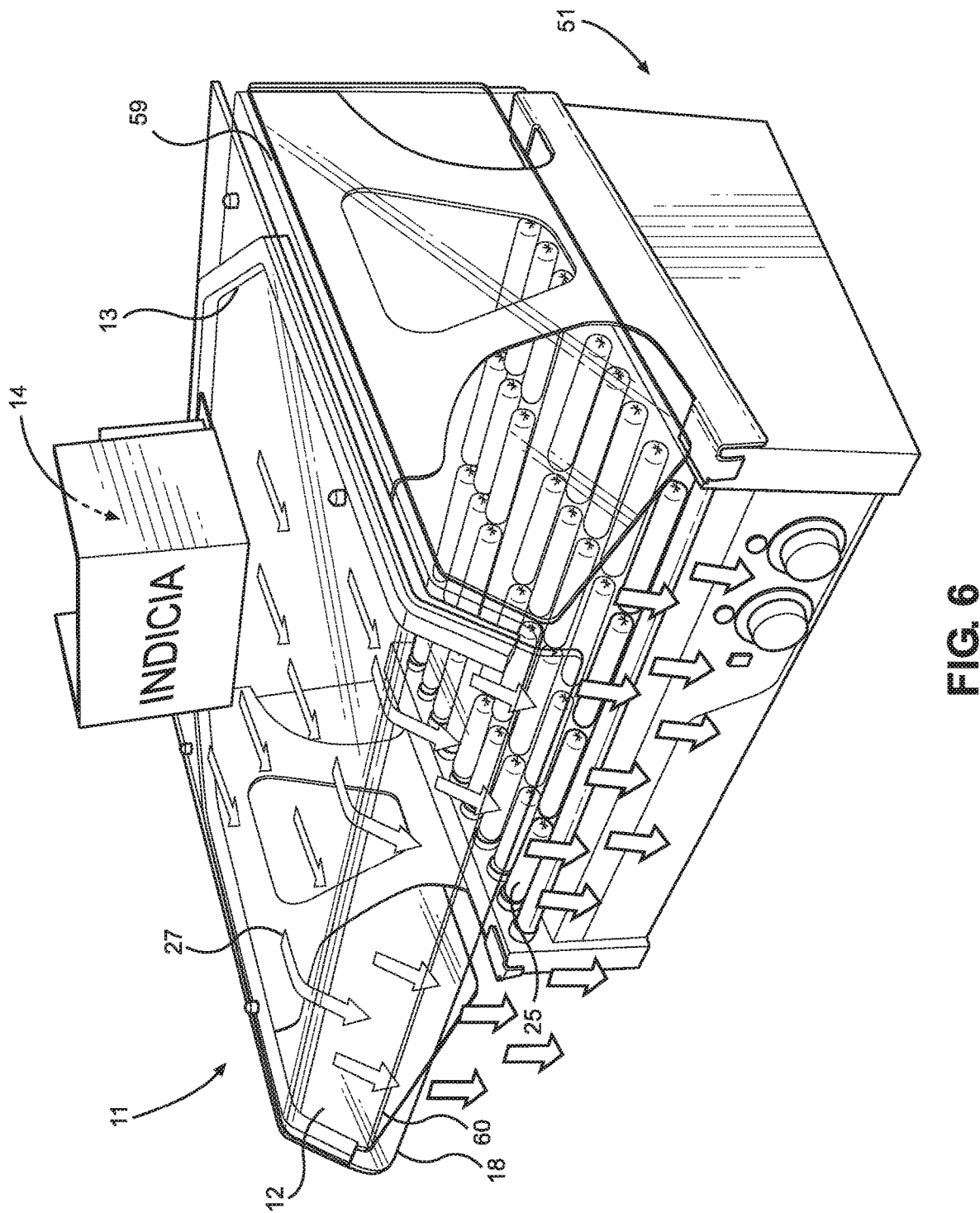
FIG. 6 shows a perspective view of the sneeze guard attachment installed on a roller grill and creating an air curtain.

Referring now to FIG. 6, there is shown a perspective view of the sneeze guard attachment 11 installed on a roller grill 51 and creating an air curtain. The sneeze guard attachment 11 is affixed to the top panel 59. The frame 13 creates a space between the sneeze guard attachment panel 12 and the top panel 59, which defines a chamber 60. The arrows represent the air 27 within the chamber 60 and forming the air curtain upon its exit. Air 27 is directed into the chamber 60 via the fan 14, and flows out of the chamber 60 via the fourth open side 18 of the panel 12. The forced air 60 creates an air curtain between the display food 25 within the roller grill 51 and the external environment outside of the roller grill 51. The sneeze guard attachment 11 can be quickly installed and removed with minimal effort for cleaning or storage.

Figure 7A:
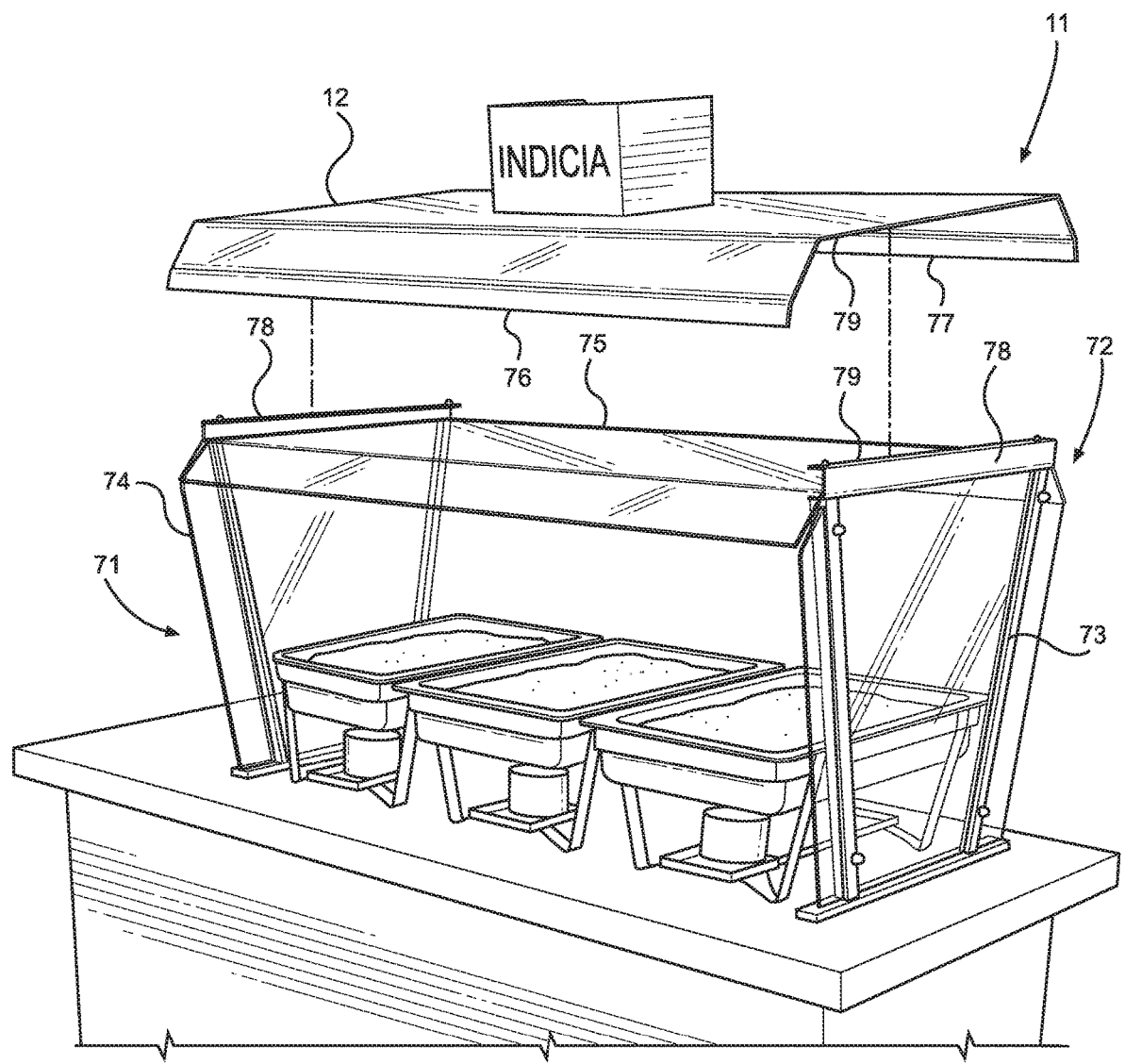
FIG. 7A shows an exploded view of the panel, a sneeze guard, and a catering stand.

Referring now to FIG. 7A, there is shown an exploded view of the panel 12, the sneeze guard 72, and a catering stand 71. Positioned on top of the catering stand 71 is a sneeze guard 72 comprising a frame 73, a pair of side panels 74, and a top panel 75. In this embodiment, the sneeze guard attachment 11 is designed for use with a catering stand 71 containing a sneeze guard 72 that is well understood in the art. The sneeze guard attachment 11 is preferably constructed with dimensions that enable it to rest on top of an existing catering stand 71 containing a sneeze guard 72. In this embodiment, the panel 11 comprises a first open end 76 and a second open end 77. The sneeze guard attachment 11 is affixed above the top panel 75 of the sneeze guard 11 and is affixed to the horizontal frame members 78. The horizontal frame members 78 creates a space between the sneeze guard attachment panel 12 and the catering stand 71 of the sneeze guard 72, which defines a chamber 79.

Figure 7B:
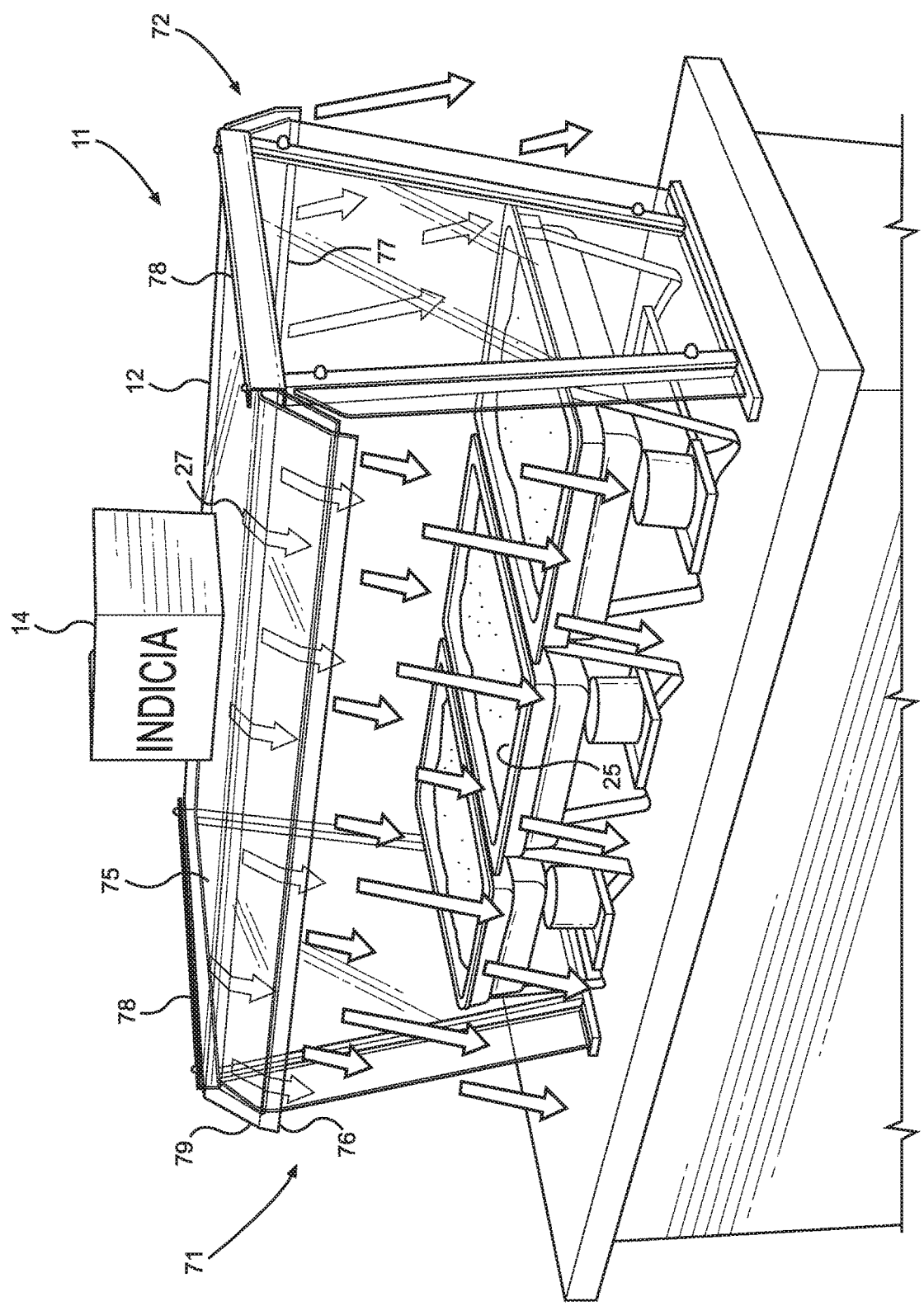
FIG. 7B shows a perspective view of the sneeze guard attachment installed on a catering stand and creating an air curtain.

Referring now to FIG. 7B, there is shown a perspective view of the sneeze guard attachment 11 installed on a catering stand 71 and creating an air curtain. The sneeze guard attachment 11 is affixed to the top panel 75. The horizontal frame members 78 creates a space between the sneeze guard attachment panel 12 and the catering stand 71 of the sneeze guard 72, which defines a chamber 79. The arrows represent the air 27 within the chamber 79 and forming the air curtain upon its exit. Air 27 is directed into the chamber 79 via the fan 14, and flows out of the chamber 79 via the first and second open sides 76, 77 of the panel 12. The forced air 27 creates an air curtain between the display food 25 within the catering stand 71 and the external environment on either side of the catering stand 71. The sneeze guard attachment 11 can be quickly installed and removed with minimal effort for cleaning or storage.

Figure 8A:
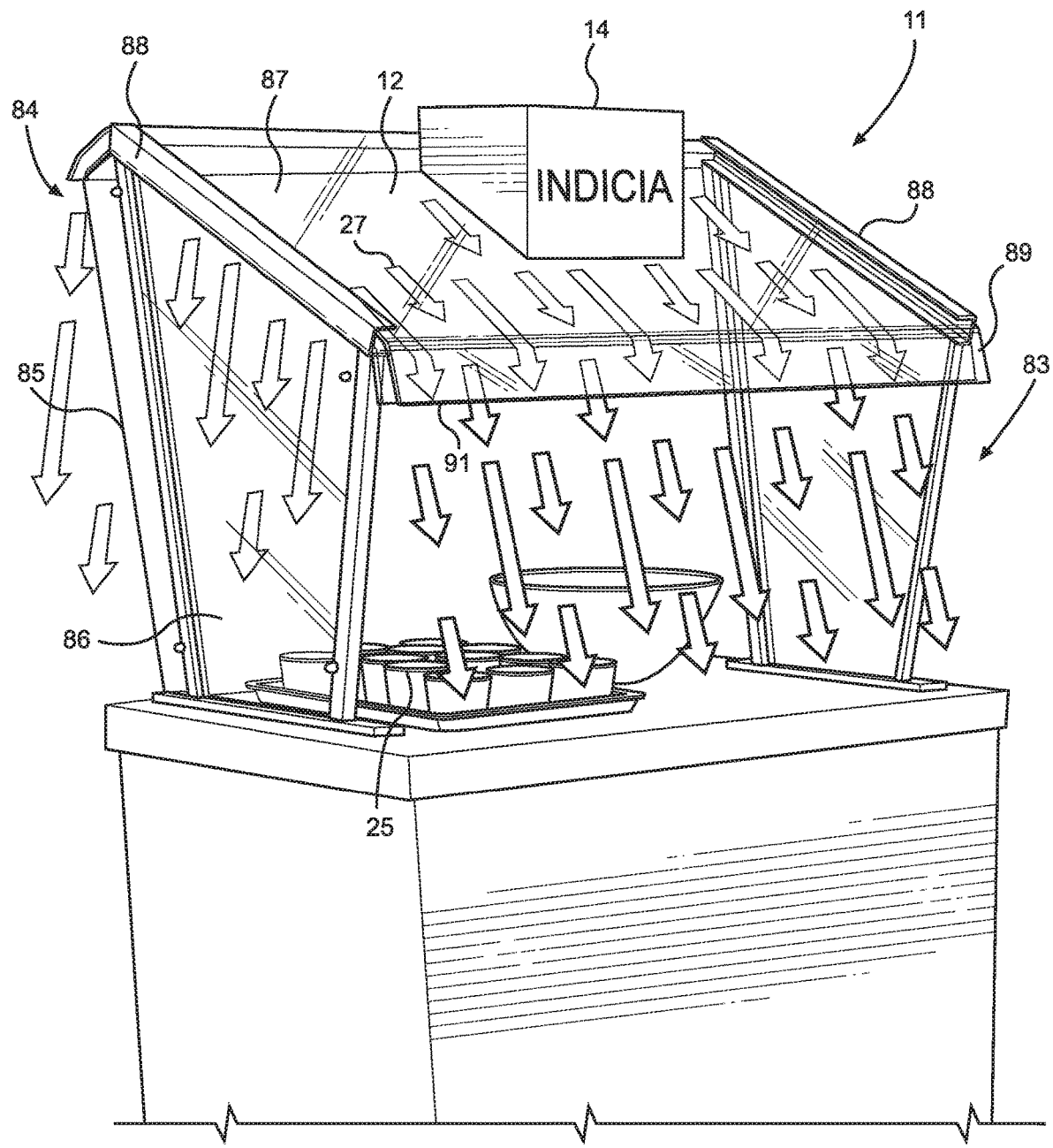
FIG. 8A shows a perspective view of the sneeze guard attachment installed on a first sample station and creating an air curtain.

Referring now to FIG. 8A, there is shown a perspective view of the sneeze guard attachment 11 installed on a first sample station 83 and creating an air curtain. Positioned on top of the first sample station 83 is a sneeze guard 84 comprising a frame 85, a pair of side panels 86, and a top panel 87. In this embodiment, the sneeze guard attachment 11 is designed for use with a sample station 83 containing a sneeze guard 84 that is well understood in the art. The sneeze guard attachment 11 is affixed to the top panel 87. The horizontal frame members 88 create a space between the sneeze guard attachment panel 12 and the sample station 83 and the sneeze guard 84, which defines a chamber 89. The arrows represent the air 27 within the chamber 89 and forming the air curtain upon its exit. Air 27 is directed into the chamber 89 via the fan 14, and flows out of the chamber 89 via the first open side 91 of the panel 12. The forced air 27 creates an air curtain between the display food 25 within the sample station 83 and the external environment outside of the sample station 83. The sneeze guard attachment 11 can be quickly installed and removed with minimal effort for cleaning or storage.

Figure 8B:
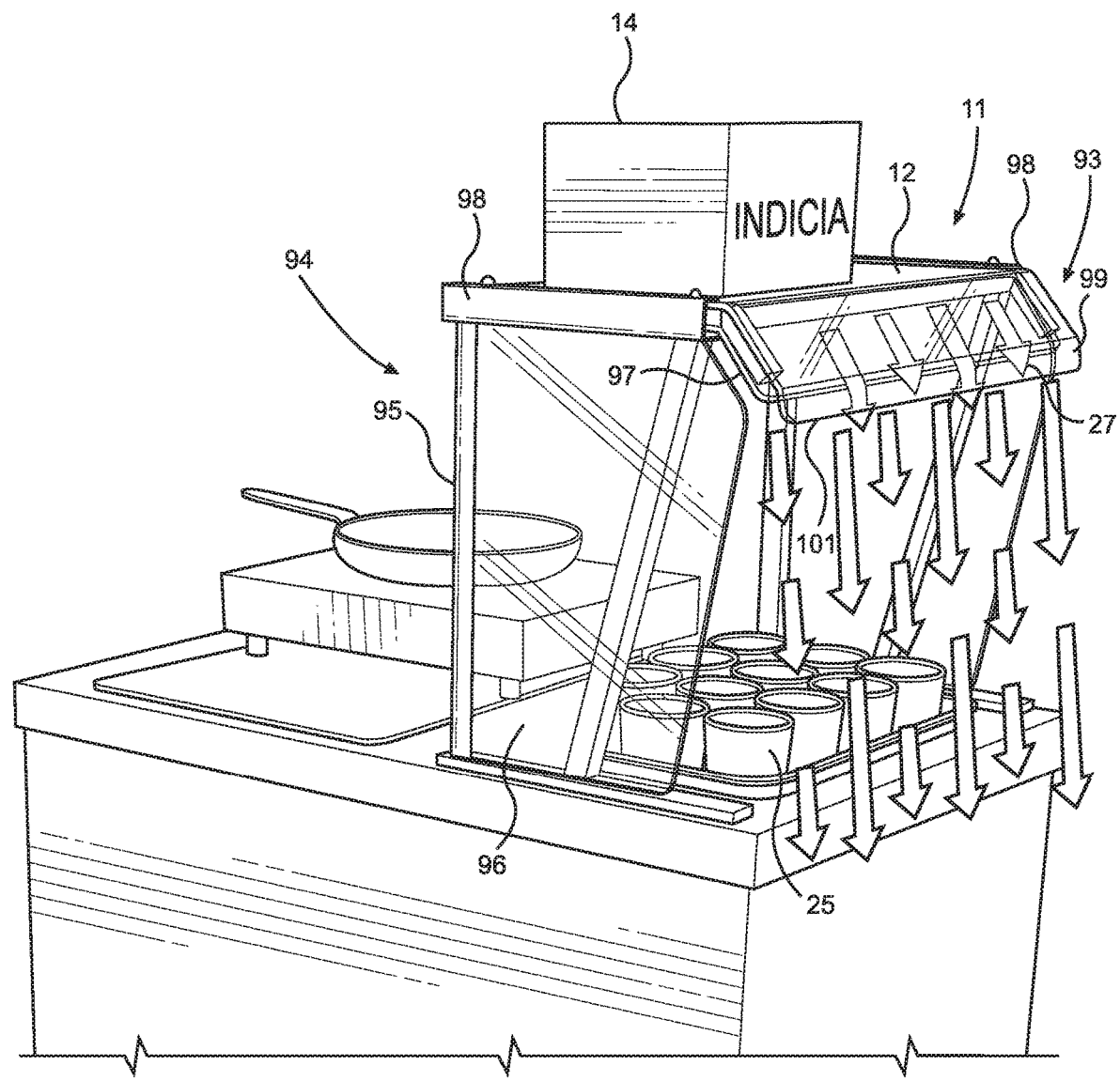
FIG. 8B shows a perspective view of the sneeze guard attachment installed on a second sample station and creating an air curtain.

Referring now to FIG. 8B, there is shown a perspective view of the sneeze guard attachment 11 installed on a second sample station 94 and creating an air curtain. Positioned on top of the second sample station 94 is a sneeze guard 93 comprising a frame 95, a pair of side panels 96, and a top panel 97. In this embodiment, the sneeze guard attachment 11 is designed for use with a sample station 94 containing a sneeze guard 93 that is well understood in the art. The sneeze guard attachment 11 is affixed to the top panel 97. The horizontal frame members 98 create a space between the sneeze guard attachment panel 12 and the sample station 94 and the sneeze guard 93, which defines a chamber 99. The arrows represent the air 27 within the chamber 99 and forming the air curtain upon its exit. Air 27 is directed into the chamber 99 via the fan 14, and flows out of the chamber 99 via the first open side 101 of the panel 12. The forced air 27 creates an air curtain between the display food 25 within the sample station 94 and the external environment outside of the sample station 94. The sneeze guard attachment 11 can be quickly installed and removed with minimal effort for cleaning or storage.

Figure 9A:
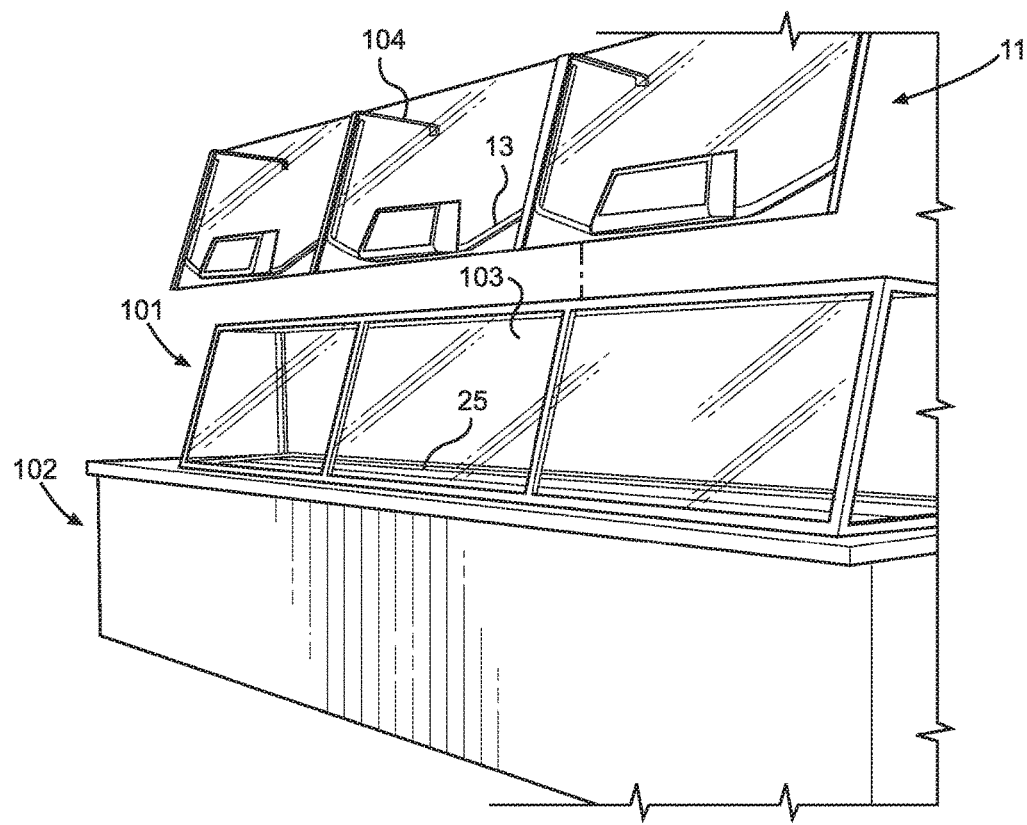
FIG. 9A shows an exploded view of multiple sneeze guard attachments, a sneeze guard, and a made-to-order catering stand.

Referring now to FIG. 9A, there is shown an exploded view of multiple sneeze guard attachments 11, the sneeze guard 101, and a made-to-order catering stand 102. In this embodiment, the made-to-order catering stand 102 includes a substantially vertical panel 103 separating the consumer from the display food 25. As the consumer does not directly handle the display food 25 from a made-to-order catering stand 102, there is no open space. Instead, the consumer views the food through the substantially vertical panel 103 as the employee prepares the display food 25. The sneeze guard 101 attaches to the substantially vertical panel 103 via one or more hooks 104 extending from the frame 13. The sneeze guard attachment 11 is preferably constructed with dimensions that enable it to attach to the front of the made-to-order catering stand 102. Multiple sneeze guard attachments 11 can be utilized to cover the entire made-to-order catering stand 102.

Figure 9B:
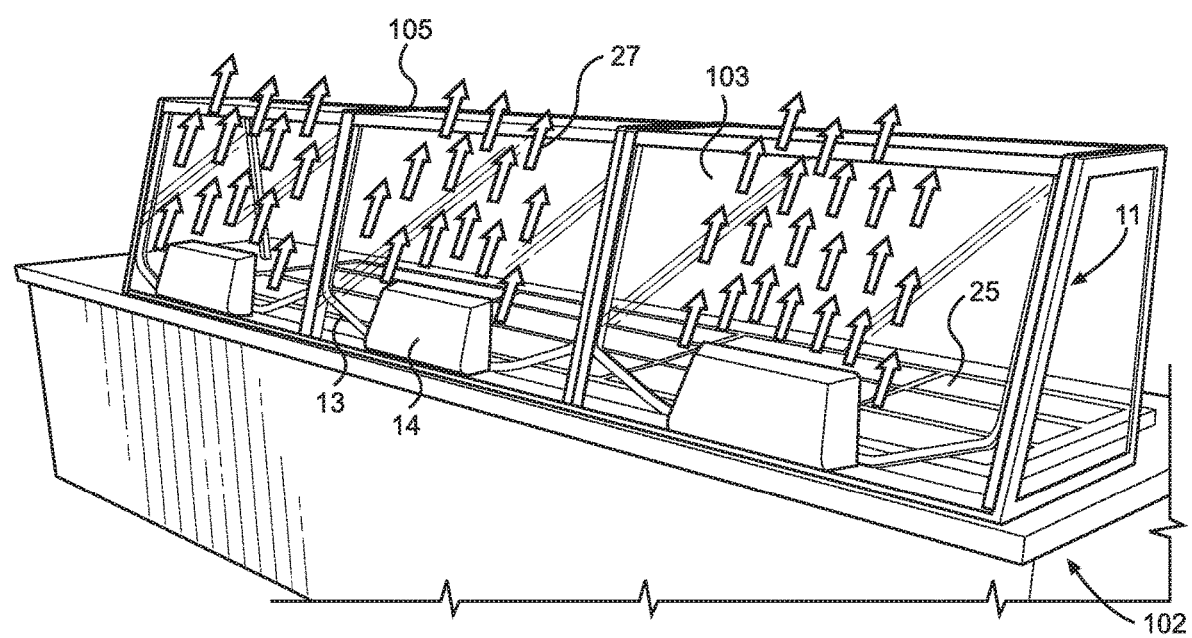
FIG. 9B shows a perspective view of the sneeze guard attachment installed on a made-to-order catering stand.

Referring now to FIG. 9B, there is shown a perspective view of the sneeze guard attachment 11 installed on a made-to-order catering stand 102. The sneeze guard attachment 11 is affixed to the substantially vertical panel 103. The frame 13 creates a space between the sneeze guard attachment 11 and the substantially vertical panel 103, which defines a chamber, as described above. The arrows represent the air 27 within the chamber and forming the air curtain upon its exit. Air 27 is directed into the chamber via the fan 14, and flows out of the chamber in a vertical direction via the open side 105. The forced air 27 creates an air curtain between the display food 25 within the made-to-order catering stand 102 and the external environment outside of the made-to-order catering stand 102. The sneeze guard attachment 11 can be quickly installed and removed with minimal effort for cleaning or storage.

Referring now to FIGS. 10A-C, there are shown perspective views of the sneeze guard attachment 11 being installed on a roller grill 51. The sneeze guard attachment 11 can be installed on a roller grill 51 in a variety of ways. Non-limiting examples include the use of adhesives, tape, fasteners, and the like. As shown, the sneeze guard attachment 11 can be installed with the use of spacers 112 and fasteners 113. The spacers 112 can attach the panel 12 to the frame 57, which is held in position via fasteners 113. The frame 13 of the sneeze guard attachment 11 rests on the top panel 59 to create the chamber (as described above) for creating the air curtain. The sneeze guard attachment 11 can be readily installed and removed as desired.

The various embodiments of the present invention as described above can be utilized with various known and existing sneeze guards. The device creates an air curtain to prevent airborne contaminants from passing through the otherwise unprotected sides of sneeze guards while still allowing full access to the display food within. The configuration of the air curtain protects display food before during, and after a customer accesses the display food. The customer can reach through the air curtain to access the desired display food, while the airborne contaminants are directed away. An additional benefit to companies is that the design and function of the sneeze guard attachment does not require additional training for employees or complicated safety rules. This ensures employees can work at the same speed as before installation of the present invention, while affording much greater safety.

An added benefit of the sneeze guard attachment is that the air curtain increases the circulation of the aromas from the display food, which is known to increase impulse purchases and boost total revenue.

Overall, the present invention provides a new and improved device for creating an air curtain between a consumer and the display food contained within self-service food operations, buffets, salad bars, catering stands, roller grills, sandwich preparation areas, and the like. The present sneeze guard attachment creates a barrier to separate the display food from the consumer, and particularly prevents contaminants, pathogens, and respiratory droplets produced by the consumer from making contact with the food. The device can be retrofitted for use with existing sneeze guards, and can be utilized with roller grills, cashier stations, cold and hot buffets, salad bars, sampling stands, sandwich preparation areas, and the like. This in turn provides a cost effective and simple solution to increase food safety for consumers.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A sneeze guard attachment for creating an air curtain between display food covered by a sneeze guard and a person, said attachment comprising:
    a panel having an upper surface and a lower surface;
    a frame affixed to said panel lower surface and defining a chamber between said lower surface of said panel and said sneeze guard, said chamber having an open end;
    a fan adapted to force air into said chamber and out said open end, such that said air forms an air curtain between said display food and said person;
    wherein a chamber extends between the lower surface and the sneeze guard to direct the air curtain from an outlet of the fan to an open side of the panel, the open side formed by a distal end of the sneeze guard;
    wherein the chamber bounds the air curtain from an exterior environment until the air curtain exits the open side; and wherein the panel and sneeze guard bend to direct the air curtain in a desired direction.

2. The device of claim 1, wherein said fan comprises a filter configured to purify air prior to entering said chamber.

3. The device of claim 1, wherein said self-service food bar comprises one or more of a buffet, a salad bar, a hot food bar, a roller grill, a made-to-order food operation, a sampling stand, a catering stand, or a sandwich preparation area.

4. The device of claim 1, wherein said means for forcing air into said chamber further comprises an off-site means for generating forced air comprising a central fan, blower, or compressor attached to said panel via one or more ducts.

5. The device of claim 4, wherein said off-site central fan, blower, or compressor is located under the counter of a self-service food bar, above or below a self-service food bar, in a basement, attic, a different room, or outside of the building.

6. The device of claim 4, wherein air flows from said off-site central fan, blower, or compressor through said one or more ducts to a diffuser, and flows out of said chamber via said open end to create an air curtain between said display food within a self-service food bar and the external environment outside of said self-service food bar.

7. The device of claim 1, wherein said sneeze guard attachment further comprises one or more advertising indicia display.

8. The device of claim 7, wherein multiple sneeze guard attachments are installed on said self-service food bar, and a single indicia display attaches over top of multiple diffusers.

9. The device of claim 1, wherein the chamber is laterally bound by the frame.

10. The device of claim 1, wherein the sneeze guard and panel have a uniform distance therebetween.

11. The device of claim 1, wherein the panel corresponds to the shape of the sneeze guard.

12. The device of claim 1, wherein the chamber extends past the distal end of the sneeze guard.

* * * * *